(12) United States Patent
Bean

(10) Patent No.: US 7,008,290 B1
(45) Date of Patent: Mar. 7, 2006

(54) ADJUSTABLE TURKEY PAN CALL HOLDER

(75) Inventor: Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

(21) Appl. No.: 10/605,557

(22) Filed: Oct. 8, 2003

(51) Int. Cl.
*A63H 5/00* (2006.01)

(52) U.S. Cl. .......................... 446/397; 446/75; 446/206

(58) Field of Classification Search ................ 446/397, 446/76, 75, 206, 208; 224/222, 267
See application file for complete search history.

(56) References Cited

U.S. PATENT DOCUMENTS

| | | | | |
|---|---|---|---|---|
| 4,955,845 A | * | 9/1990 | Piper | 446/397 |
| 5,111,981 A | * | 5/1992 | Allen | 224/620 |
| 5,244,430 A | * | 9/1993 | Legursky | 446/397 |
| 5,555,664 A | * | 9/1996 | Shockley | 43/1 |
| 5,607,091 A | * | 3/1997 | Musacchia | 224/222 |
| 6,599,167 B1 | * | 7/2003 | Waltz | 446/397 |

OTHER PUBLICATIONS

WEB page from cabelas.com showing "Primos The Freak Call".

* cited by examiner

*Primary Examiner*—Bena Miller
(74) *Attorney, Agent, or Firm*—Simmons, Perrine, Albright & Ellwood, PLC

(57) ABSTRACT

A system and method for holding turkey pan calls which utilize a holder with legs that elevate the bottom of the pan call, having a plurality of grasping fingers which grip a side portion of a turkey pan call in response to a mechanical adjustment.

21 Claims, 3 Drawing Sheets

ADJUSTABLE TURKEY PAN CALL HOLDER

BACKGROUND OF INVENTION

For years, the typical turkey pan call has been a circular friction call with a circular playing surface disposed above a generally cylindrical sound chamber with at least one hole in the bottom from where sound propagates.

A hunter often rests the call on the hunter's leg. This tends to attenuate the sound produced by the call. To avoid this, the hunter would often tip the call on its side to expose the bottom of the call. This makes it difficult to play, because the top-playing surface is then vertical, or at least no longer horizontal.

One method of avoiding the need to tip the call is described in U.S. Pat. No. 5,607,091 to John Musacchia, which is an example of a call holder which accepts a turkey pan call into an aperture in a platform having legs. The legs elevate the bottom of the turkey pan call so that sound is not occluded by the operator's leg. The turkey pan call is held in place by resilient members or rubber bands which extend over the playing surface of the pan call.

While such turkey pan call holders have been used in the past, they do have some drawbacks. One of the most significant drawbacks to such a pan call holder is the obstruction caused by the resilient member extending over the pan call itself. The obstruction can make it difficult to freely move a striker about the entire playing surface of the call and thereby can restrict the operator from certain areas of the pan call surface unless the operator manually moves or otherwise pushes the resilient member to the side. However, when an operator is calling a turkey, it is often desirable to limit the motion occurring at the source of the sound call.

Consequently, there exists a need for improved methods and systems for holding a turkey friction pan call in an efficient manner.

SUMMARY OF INVENTION

It is an object of the present invention to provide a system and method for holding a turkey friction pan call in an efficient manner.

It is a feature of the present invention to utilize a plurality of side rim grasping pan call holding members.

It is another feature of the present invention to include a mechanical adjustment which accommodates variably sized pan calls.

It is an advantage of the present invention to achieve improved efficiency in holding various sized pan calls.

The present invention is an apparatus and method for holding turkey friction pan calls, designed to satisfy the aforementioned needs, provide the previously stated objects, include the above-listed features, and achieve the already articulated advantages. The present invention is carried out in a "wasted motion-less" manner in a sense that motion often associated with displacing any resilient member disposed over the pan call playing surface has been greatly reduced.

Accordingly, the present invention is a system and method including a turkey friction call holder with a plurality of rim grasping members which grip a side rim portion of the turkey pan call.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
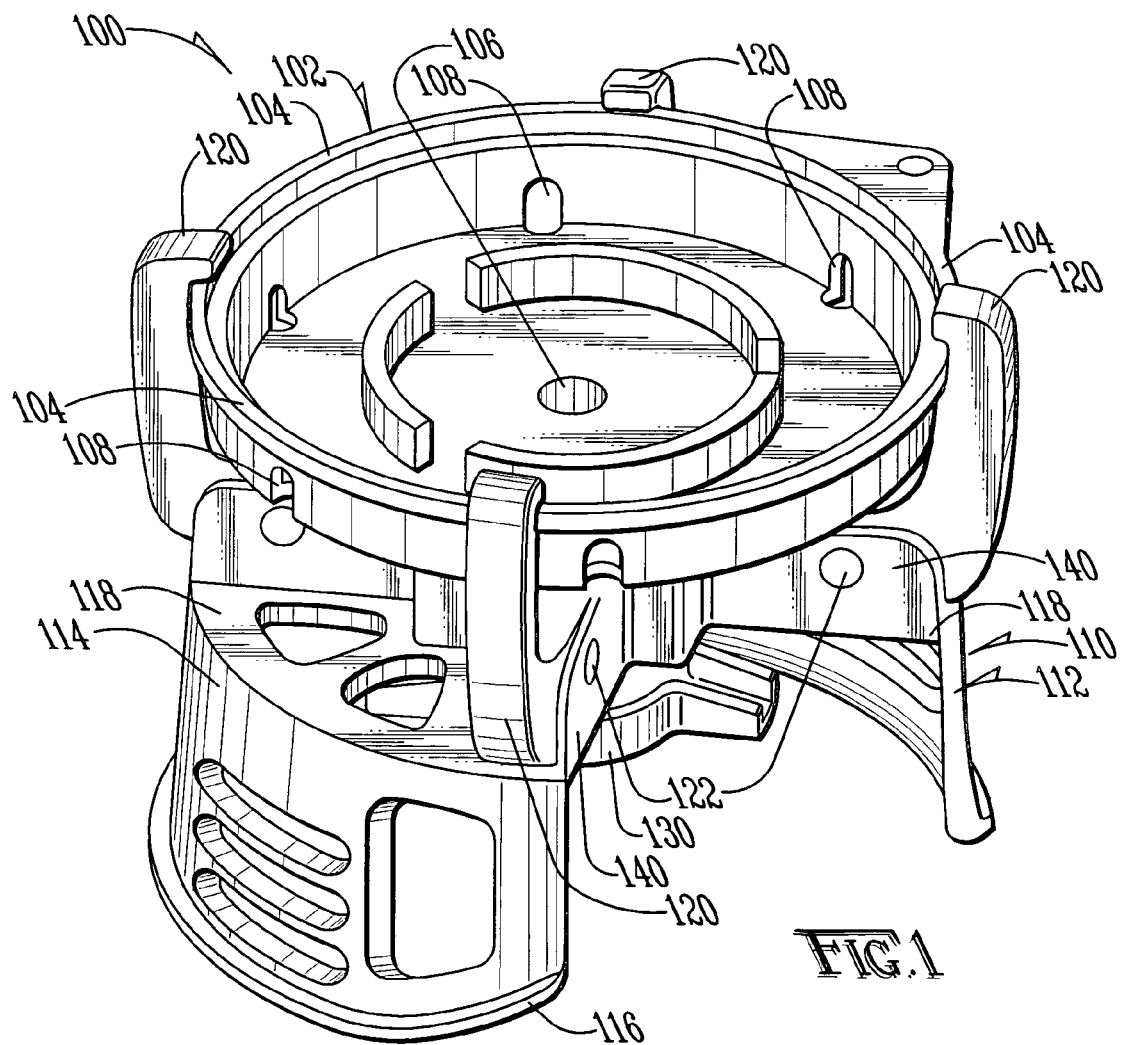
FIG. 1 is a downward looking perspective view of a turkey friction pan call and pan call holder of the present invention.

Now referring to the drawings wherein like numerals refer to like matter throughout, and more specifically referring to FIG. 1, there is shown a call holder of the present invention generally designated 100, including a turkey pan call 102 (which is shown without the slate or playing surface) disposed in the turkey pan call holder 110. Turkey pan call 102 is shown having a turkey pan call edge rim 104, a turkey pan call bottom sound port 106, and a plurality of turkey pan call side sound ports 108. Numerous variations exist in the prior art for turkey pan calls. The present invention is intended to be able to retain numerous varying types and sizes of pan calls.

Turkey pan call holder 110 includes a first leg 112 and a second leg 114 which each has a bottom end 116 and a top end 118. Coupled to top end 118 is support 140 which is designed to provide support for the rim gripping member 120. Rim gripping member 120 is shown as an "L"-shaped member with a top portion which extends generally vertically and a lower portion which extends generally horizontally. Rim gripping member 120 is disposed between supports 140 and pivots at pivot point 122. The pivoting of rim gripping member 120 could be accomplished by many different ways, such as the pin or sleeve disposed through holes in rim gripping member 120 and support 140 as shown. It can be seen that a portion of rim gripping member 120 extends above and slightly over the edge of the turkey pan call edge rim 104. This arrangement may be preferable; however, it is not essential. Rim gripping member 120 could be adapted to merely place pressure on the sides of the turkey pan call 102.

Now referring to FIG. 2, there is shown a view of the turkey pan call holder 110 of FIG. 1 (without the turkey pan call 102 disposed therein) which is viewed from below to expose more of an underside of turkey pan call holder 110. More specifically, 130 is more fully shown. Additionally, rim mating void 202 in rim gripping member 120 is shown more easily when turkey pan call 102 is not present.

Figure 2:
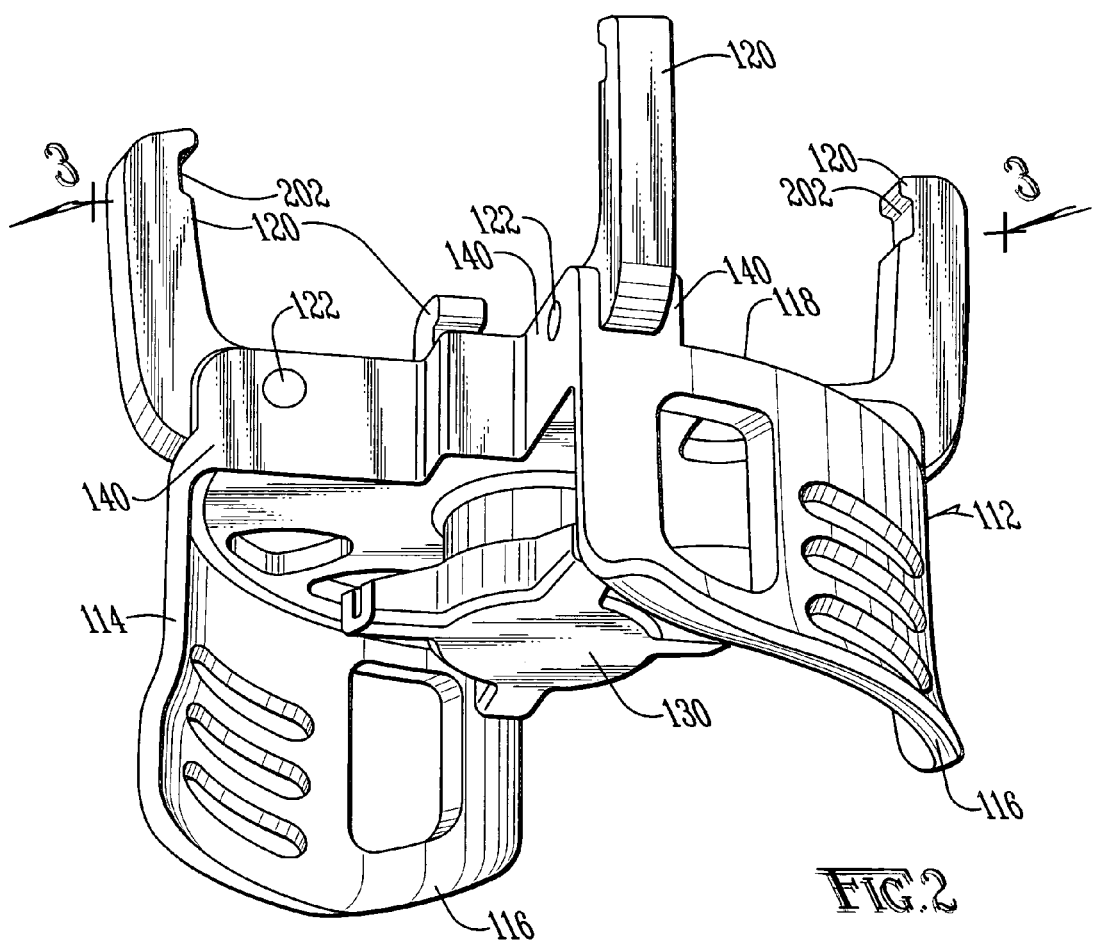
FIG. 2 is an upward looking perspective view of a turkey friction pan call holder of the present invention.
Figure 3:
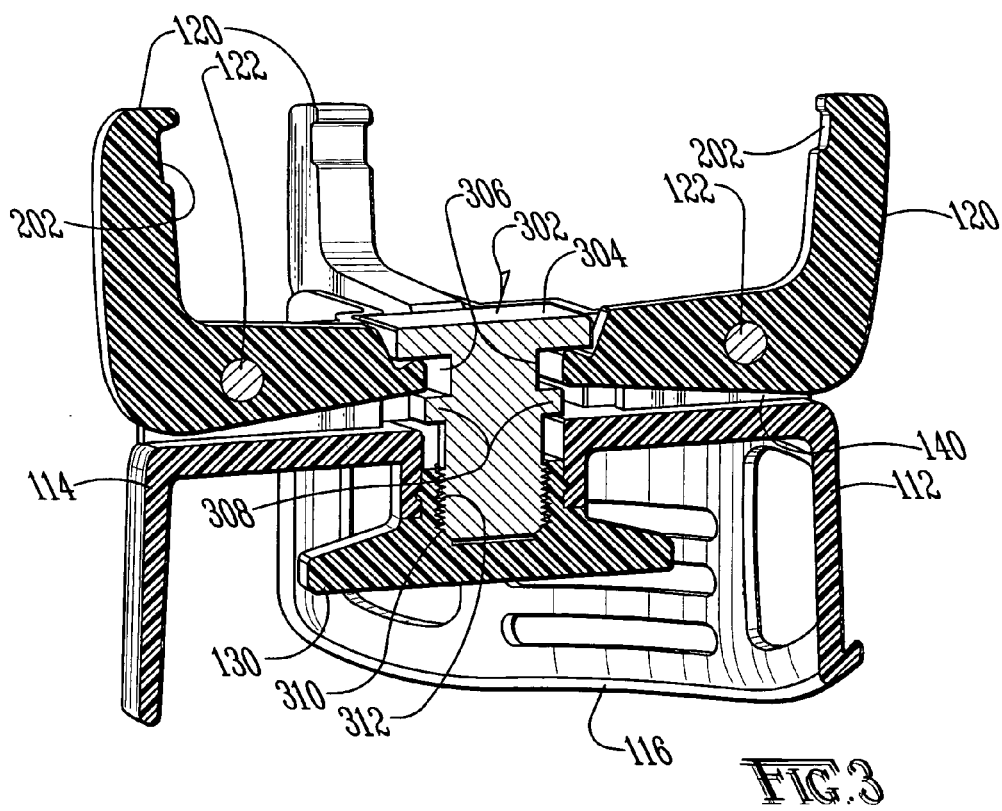
FIG. 3 is a cross-sectional view of a turkey pan call holder taken on line 3—3 of FIG. 2.

Now referring to FIG. 3, there is shown a cross-sectional view of the turkey pan call holder 110 taken on line 3—3 of FIG. 2. Actuator 302 is shown centrally disposed between the rim gripping members 120 and extending down to adjusting screw handle 130. Actuator 302 includes an actuator top surface 304, a gripping member lower end receiving void 306, and a gripping member lower end retaining protuberance 308. Actuator 302 further includes actuator threads 310 which mate with screw knob threads 312 of adjusting screw handle 130.

In operation, when adjusting screw handle 130 is twisted, first leg 112 and second leg 114 prohibit adjusting screw handle 130 from moving upward so actuator 302 is drawn downward, causing the lower ends of rim gripping members 120 to be drawn downward as well. This causes the top portions of rim gripping members 120 to move inward, thereby making the space between them smaller and more capable of firmly retaining a turkey pan call 102. Of course, the process could be reversed, and the rim mating voids 202 of the rim gripping members 120 would separate so as to allow for reception of a larger turkey pan call.

Throughout this description, reference is made to a turkey pan call because it is believed that the beneficial aspects of the present invention would be most readily apparent when used with a turkey call; however, it should be understood that the present invention is not intended to be limited to use with turkey calls and should be hereby construed to include use with other non-turkey calls as well.

The components of the turkey pan call holder 110 of the present invention are preferably made of an inexpensive and strong rigid material, such as PVC or other plastic material. Of course, any suitable material could be used as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

The invention claimed is:

1. An improved friction pan call holder comprising:
a plurality of gripping structures which are configured to have portions thereof which are inwardly movable toward sides of a game call of the type having a top playing surface;
a support structure for elevating a game call above a surface;
an adjustment mechanism coupled to said plurality of gripping structures and said support structure;
said adjustment mechanism being configured to manipulate said plurality of gripping structures, so that the game call disposed between said plurality of gripping structures is squeezed by said plurality of gripping structures so as to retain the game call in a fixed relationship with respect to said support structure without said plurality of gripping structures spanning a substantial portion of the top playing surface.

2. An apparatus of claim 1 wherein said plurality of gripping structures are each pivotally coupled to a support.

3. An apparatus of claim 2 wherein said adjustment mechanism causes said plurality of gripping members to pivot.

4. An apparatus of claim 3 wherein said adjustment mechanism comprises a threaded member which, when advanced, causes said plurality of gripping structures to pivot.

5. An apparatus of claim 4 wherein each of said plurality of gripping structures has a rim-mating void therein, for mating with a rim of the game call.

6. A apparatus of claim 5 wherein a portion of said gripping structures extends over a portion of a rim around a top surface of said game call.

7. A method of retaining a game call comprising the steps of:
providing a game call having a top playing surface, and a rim around a periphery of said game call;
inserting said game call between a plurality of rim gripping members;
manipulating by a screwing motion said plurality of rim gripping members, in response to a force from a source other than contact with said game call, so as to cause each of said plurality of rim gripping members to exert a force directed inwardly of said rim and toward a common central point, so as to gasp said game call at said rim and to retain said game call between said plurality of rim gripping members.

8. A game call holder comprising:
a base;
a plurality of "L"-shaped rigid members, pivotally coupled to said base;
a threaded actuator disposed centrally with respect to said plurality of "L"- shaped rigid members and extending through said base;
a threaded handle disposed below said base and coupled to said threaded actuator, said threaded handle configured to rotate independently with respect to said base;
said threaded actuator being configured to translate when said rotating threaded handle is turned; and,
said base configured to receive a flexible strap for securing said base to an object.

9. An apparatus of claim 8 further comprising a strap and buckle configurable to retain said base around a human thigh.

10. A turkey calling system comprising:
a turkey friction pan call comprising:
a substantially circular top playing surface,
a pan disposed beneath said top playing surface,
said pan having a top rim peripheral to said top playing surface; and,
said pan having a sound port therein;
a plurality of rigid "L"-shaped jaws each having a contour on an upper end which contour is configured to minimize contact between said jaw and said top playing surface, when said jaw engages said top rim;
a plurality of supports disposed about said plurality of rigid "L"-shaped jaws, configured to provide support for said plurality of rigid "L"-shaped jaws;
a base coupled to said plurality of supports;
said plurality of rigid "L"-shaped jaws being pivotally mounted with respect to said base;
a threaded actuator disposed between said plurality of rigid "L"-shaped jaws, said threaded actuator configured to pivot said plurality of rigid "L"-shaped jaws when said threaded actuator translates vertically;
a threaded handle coupled to said threaded actuator and said threaded handle being configured to translate said threaded actuator vertically when said threaded handle is rotated; and,
a strap coupled to said base, said strap being sized and configured to couple said base to an object having a size of a human thigh.

11. An apparatus for holding a game call comprising:
means for applying a plurality of forces directed inwardly with respect to a plurality of points around a peripheral top rim of a game call having a top playing surface;
means for simultaneously adjusting said plurality of forces; and,
means for elevating the game call above a surface.

12. A apparatus of claim 11 wherein said means for applying contacts the game call only about said peripheral top rim.

13. An apparatus of claim 12 wherein said means for applying comprises a plurality of members, each having a contoured region for mating with the peripheral top rim.

14. An apparatus of claim 11 wherein said means for simultaneously adjusting comprises a rotating threaded member.

15. An apparatus of claim 11 wherein said means for elevating is configured to retain a strap, which said swap is configured to extend around a human thigh-sized object.

16. An apparatus of claim 13 wherein said plurality of members each are contoured such so as to not contact the top playing surface of the game call when the game call is retained between said plurality of members.

17. A system for calling wild turkeys comprising:
   a pan call having a substantially circularly shaped top playing surface;
   said pan call being configured to generate sounds when a striker moves across said top playing surface;
   said pan call further having a sound port configured to permit sound to exit said pan call;
   a plurality of movable jaws, disposed around a peripheral top rim of said pan call;
   said plurality of movable jaws each being configured to contact said peripheral top rim while minimizing contact with said top playing surface;
   means for simultaneously adjusting a separation distance between end points of said plurality of movable jaws;
   means for securing said pan call at a location above an object.

18. A system comprising:
   a game call comprising a circular top playing surface and a pan having a top rim around a peripheral edge of said circular top playing surface;
   said pan positioned beneath said circular top playing surface, said pan having a sound port therein;
   means for squeezing said top rim from a plurality of points around said top rim so as to grasp said game call; and,
   means below said pan for adjusting magnitudes of forces being applied by said means for squeezing.

19. A method of retaining a turkey friction pan call comprising the steps of:
   providing a turkey friction pan call;
   disposing said turkey friction pan call between a plurality of movable jaws; and,
   adjusting a separation distance between said jaws so as to grasp said turkey friction pan call around a peripheral rim.

20. A method of claim 19 further comprising the steps of:
   securing said turkey friction pan call to an object with an elongated flexible strap.

21. An apparatus for holding a game call having a top playing surface and a peripheral top rim, the apparatus for holding comprising:
   a plurality of non-elastic structures configured to grasp therebetween the peripheral top rim;
   an adjusting mechanism for varying a separation distance between ends of said plurality of non-elastic structures; and,
   a strap coupled to said adjusting mechanism, said strap sized and configured to extend around a human thigh.

* * * * *

UNITED STATES PATENT AND TRADEMARK OFFICE
CERTIFICATE OF CORRECTION

PATENT NO. : 7,008,290 B1
DATED : March 7, 2006
INVENTOR(S) : Ron M. Bean

It is certified that error appears in the above-identified patent and that said Letters Patent is hereby corrected as shown below:

<u>Column 4,</u>
Line 4, delete "gasp" and insert -- grasp --.

<u>Column 5,</u>
Line 2, delete "swap" and insert -- strap --.

Signed and Sealed this

Thirteenth Day of June, 2006

JON W. DUDAS
*Director of the United States Patent and Trademark Office*